// 
US009256098B2

(12) United States Patent
Han et al.

(10) Patent No.: US 9,256,098 B2
(45) Date of Patent: Feb. 9, 2016

(54) LIQUID CRYSTAL PANEL AND COLOR FILTER SUBSTRATE THEREOF

(71) Applicant: SHENZHEN CHINA STAR OPTOELECTRONICS TECHNOLOGY CO., LTD., Shenzhen (CN)

(72) Inventors: Bing Han, Shenzhen (CN); Zuomin Liao, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 114 days.

(21) Appl. No.: 14/234,400

(22) PCT Filed: Jan. 7, 2014

(86) PCT No.: PCT/CN2014/070194
§ 371 (c)(1),
(2) Date: Jan. 23, 2014

(87) PCT Pub. No.: WO2015/096202
PCT Pub. Date: Jul. 2, 2015

(65) Prior Publication Data
US 2015/0185547 A1  Jul. 2, 2015

(30) Foreign Application Priority Data
Dec. 27, 2013  (CN) .......................... 2013 1 0738277

(51) Int. Cl.
*G02F 1/1343* (2006.01)
*G02F 1/1335* (2006.01)
*G02B 5/22* (2006.01)
*G02B 5/20* (2006.01)

(52) U.S. Cl.
CPC .......... *G02F 1/133514* (2013.01); *G02B 5/201* (2013.01); *G02B 5/22* (2013.01); *G02F 1/133512* (2013.01)

(58) Field of Classification Search
CPC ............... H01L 29/78633; G02F 1/133509; G02F 1/133512; G02F 1/133514; G02F 1/136286; G02F 1/1333; G02F 1/134309; G02F 1/1343; G02F 1/1345; G02F 1/1362; G02F 2001/134318; G02F 2201/52; G09G 2300/0426; G09G 2320/0626
USPC ............. 349/106, 43, 139, 42, 110, 155, 143; 257/E29.273, E33.062
See application file for complete search history.

(56) References Cited

U.S. PATENT DOCUMENTS

2002/0101557 A1*  8/2002  Ono et al. ..................... 349/143
2007/0146609 A1   6/2007  Lai et al.
2007/0159586 A1*  7/2007  Kim et al. ..................... 349/143

FOREIGN PATENT DOCUMENTS

CN  101038383 A  9/2007
CN  100437238 C  11/2008

* cited by examiner

*Primary Examiner* — Thoi Duong
(74) *Attorney, Agent, or Firm* — Mark M. Friedman

(57) ABSTRACT

The present invention discloses a liquid crystal panel and a color filter substrate thereof. By providing at least one separation line perpendicular to a scan direction of horizontal source signals, a transparent conductive layer of the color filter substrate is divided into a plurality of transparent conductive layer sections, each of which is not connected with the others. When a horizontal crosstalk (H-crosstalk) phenomenon is generated, an adjacent horizontal area is not influenced, so that it can lower the H-crosstalk phenomenon of the liquid crystal panel, so as to increase the display quality of the liquid crystal panel.

8 Claims, 3 Drawing Sheets

LIQUID CRYSTAL PANEL AND COLOR FILTER SUBSTRATE THEREOF

FIELD OF THE INVENTION

The present invention relates to the technical field of liquid crystal panels, and more particularly to a color filter substrate of the liquid crystal panel which can decrease a horizontal crosstalk (H-crosstalk) phenomenon thereof.

BACKGROUND OF THE INVENTION

A liquid crystal display (LCD) is a type of flat panel display (FPD) which displays images by the properties of the liquid crystal material. In comparison with other display devices, the LCD has the advantages of being lightweight, compact, having a low driving voltage and having low power consumption, and thus has already become the mainstream product in the consumer market.

In the traditional manufacturing process of an LCD panel, it comprises a front-end array process, a mid-end cell process, and a back-end modulation process. The front-end array process is used to produce thin-film transistor (TFT) substrates (also called array substrates) and color filter (CF) substrates; the mid-end cell process is used to combine the TFT substrate with the CF substrate, then fill liquid crystal into a space therebetween, and then they are cut to form panels compatible with a suitable product size; and the back-end modulation process is used to execute an installation process on the combined panel, a backlight module, a panel driver circuit, an outer frame, etc.

The LCD can display color images based on the function generated by the color filter: when a backlight source of the LCD is controlled and adjusted by the liquid crystal material and a driver IC to provide a light source of gray scale, the light source of gray scale can pass through the color filter to for red, green and blue light due to three color resists coated on the color filter, and the red, green and blue light are finally mixed with each other into the color images. Therefore, the color filter is a key component of LCD, and the basic structure of the color filter is constructed by a glass substrate, a black matrix layer, a color pixel layer, and a transparent conductive layer (indium tin oxide layer).

As mentioned above, LCD driver chips are important components of the LCD, and the main function thereof is to output the needed voltage to pixels, so as to control the twist degree of the liquid crystal molecules. There are two types of LCD driver chips: one is the source driver chip arranged on the X-axis, the other is the gate driver chip arranged on the Y-axis. In other words, the source driver chips control image signals, and the gate driver chips control gate switch signals, so they have different functions for the LCD panel. Simply speaking, images of an LCD are formed by scanning lines one by one. The gate driver chip controls the vertical signals. If the scanning is started from the topmost line, the first pin of the gate driver chip is set to be switched on, and the others are set to be switched off. The signals in the source driver chip are the real signal (horizontal), and the sent signal is only accepted by the horizontal pixels of the first line. After the signal of the first line is transmitted, the second line will be the next one, while the content of the source driver chip is changed to the second line, and the second pin of the gate driver chip is switched on, and the others are switched off, so that the data is transmitted to the second line.

In the traditional technology, the electric potential of a common electrode (COM) of a color filter substrate is easy to be coupled by an influence of a high or low electric potential, so that a horizontal crosstalk (H-crosstalk) phenomenon is generated. Referring now to FIGS. 1A and 1B, a schematic view of a traditional liquid crystal panel with a normal image is illustrated in FIG. 1A; and a schematic view of a traditional liquid crystal panel producing an image of a horizontal crosstalk phenomenon is illustrated in FIG. 1B.

As shown in FIG. 1A, when a brightness difference between an area A (for example a low brightness rectangle) and an area B (for example a dark area outside of the area A) is small, the liquid crystal panel can display a normal image.

As shown in FIG. 1B, when the brightness difference between the area A (for example a high brightness rectangle) and the area B (for example a dark area outside of the area A) is increased to a certain level, an electric potential of the COM of the color filter substrate in area B, which is horizontally near the area A, is coupled with a high electric potential of the area A through a transparent conductive layer (ITO) of the color filter substrate, so that an H-crosstalk phenomenon is generated. Therefore, the dark area B nearing the area A is lighted, so as to influence the display quality of the liquid crystal panel.

In the traditional technical field of liquid crystal panels, a circuit design is generally adopted to decrease the influence of the H-crosstalk phenomenon. However, since the H-crosstalk phenomenon is generated based on an interactive effect of circuit couple, it is not quite effective to improve the H-crosstalk phenomenon by the circuit design.

As a result, it is necessary to provide a liquid crystal panel and a color filter substrate thereof to solve the problems existing in the conventional technology.

SUMMARY OF THE INVENTION

The major object of the present invention is to provide a liquid crystal panel and a color filter substrate thereof. By changing the structure of the color filter substrate of the liquid crystal panel, it can lower a horizontal crosstalk (H-crosstalk) phenomenon of the liquid crystal panel.

To achieve the above object, the present invention provides a color filter substrate, which comprises:
   a glass substrate;
   a black matrix layer disposed on the glass substrate to form a plurality of array-shaped spaces disposed on the glass substrate;
   a color pixel layer disposed on the glass substrate and including first, second and third color resist units respectively disposed in the corresponding spaces of the black matrix layer; and
   a transparent conductive layer covering the black matrix layer and the color pixel layer, wherein the transparent conductive layer has at least one separation line perpendicular to a scan direction X of horizontal source signals, and the separation line divides the transparent conductive layer into a plurality of transparent conductive layer sections, each of which is unconnected with the others.

In one embodiment of the present invention, a plurality of the separation lines are equidistantly spaced apart from each other.

In one embodiment of the present invention, the separation line is disposed above the black matrix layer.

In one embodiment of the present invention, two ends of each of the transparent conductive layer sections are provided with at least one conductive through hole, respectively.

To achieve another above object, the present invention provides a liquid crystal panel, which comprises:
   an array substrate, a surface of which is provided with a plurality of array-arranged thin-film transistors; and a color filter substrate, which includes:

a glass substrate;

a black matrix layer disposed on the glass substrate to form a plurality of array-shaped spaces disposed on the glass substrate;

a color pixel layer disposed on the glass substrate, which includes first, second and third color resist units respectively disposed in the corresponding spaces of the black matrix layer; and a transparent conductive layer covering the black matrix layer and the color pixel layer, wherein the transparent conductive layer has at least one separation line perpendicular to a scan direction X of horizontal source signals, and the separation line divides the transparent conductive layer into a plurality of transparent conductive layer sections, each of which is unconnected with the others;

wherein the thin-film transistors of the array substrate correspond with the black matrix layer of the color filter substrate, and a constant distance is kept between the array substrate and the color filter substrate for filling with liquid crystal.

In one embodiment of the present invention, a plurality of the separation lines are equidistantly spaced apart from each other.

In one embodiment of the present invention, the separation line is disposed above the black matrix layer.

In one embodiment of the present invention, two ends of each of the transparent conductive layer sections are provided with at least one conductive through hole, respectively.

In one embodiment of the present invention, an inner surface of the array substrate is further provided with a plurality of transparent conductive layers of the array substrate, which correspond with the color pixel layer of the color filter substrate.

In one embodiment of the present invention, the transparent conductive layers of the array substrate are electrically unconnected with the transparent conductive layer of the color filter substrate.

Hence, in the present invention, by at least one separation line being perpendicular to a scan direction of horizontal source signals, a transparent conductive layer of the color filter substrate is divided into a plurality of transparent conductive layer sections, and each of which is unconnected with the others. When a horizontal crosstalk (H-crosstalk) phenomenon is generated, an adjacent horizontal area is not influenced, so that it can lower the H-crosstalk phenomenon of the liquid crystal panel, so as to increase the display quality of the liquid crystal panel.

DETAILED DESCRIPTION OF THE PREFERRED EMBODIMENTS

The foregoing objects, features, and advantages adopted by the present invention can be best understood by referring to the following detailed description of the preferred embodiments and the accompanying drawings. Furthermore, the directional terms described in the present invention, such as upper, lower, front, rear, left, right, inner, outer, side, etc., are only directions referring to the accompanying drawings, so that the used directional terms are used to describe and understand the present invention, but the present invention is not limited thereto. Furthermore, the figures of the present invention are shown in simplification, and some details which are unrelated to the explanation are also omitted.

Figure 1A:
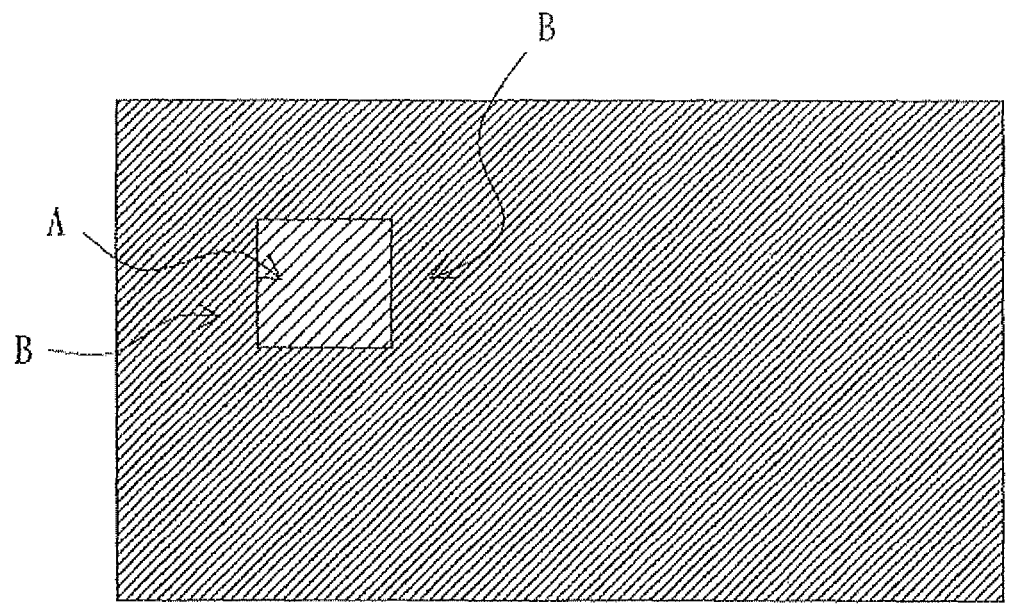
FIG. 1A is a schematic view of a traditional liquid crystal panel with a normal image.
Figure 1B:
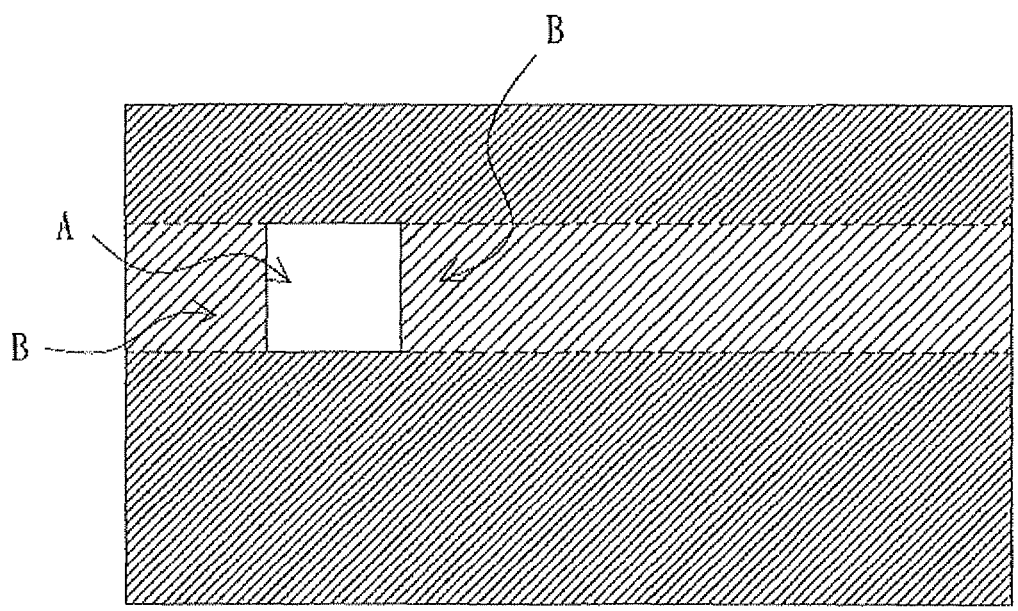
FIG. 1B is a schematic view of a traditional liquid crystal panel producing an image of a horizontal crosstalk phenomenon.
Figure 2:
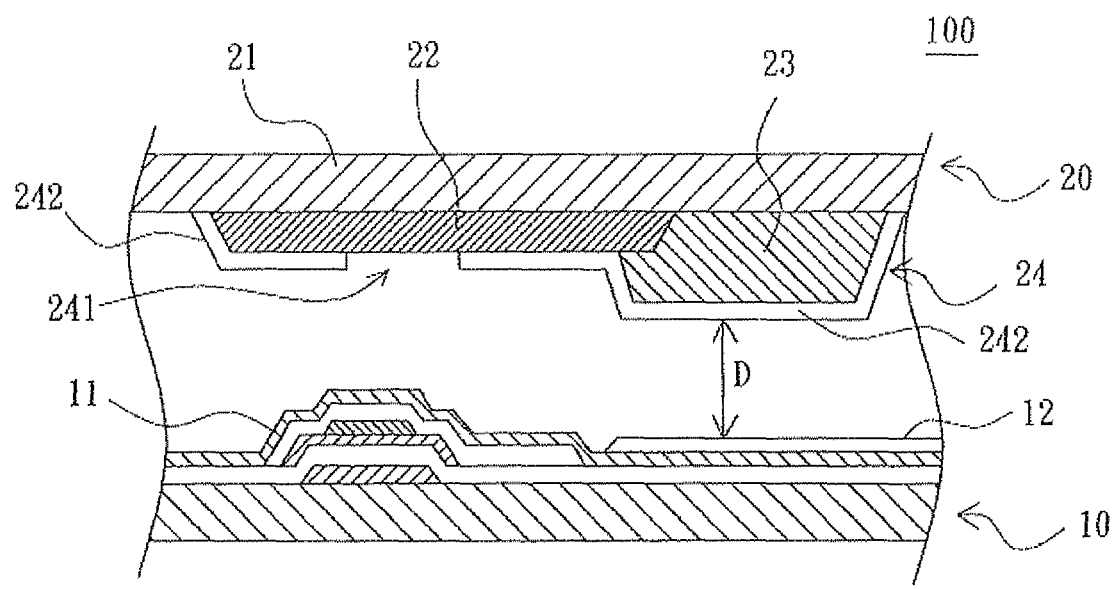
FIG. 2 is a partial cross-sectional schematic view of a liquid crystal panel according to a first preferred embodiment of the present invention.

Referring now to FIG. 2, a partial cross-sectional schematic view of a liquid crystal panel according to a first preferred embodiment of the present invention is illustrated in FIG. 2. As shown in FIG. 2, a liquid crystal panel 100 according to a first preferred embodiment of the present invention mainly comprises an array (TFT) substrate 10 and a color filter (CF) substrate 20. A surface of the array substrate 10 is provided with a plurality of thin-film transistors 11 arranged in an array shape. Furthermore, the color filter substrate 20 comprises a glass substrate 21, a black matrix layer 22 and a color pixel layer 23. The black matrix layer 22 is disposed on the glass substrate 21, and forms a plurality of array-shaped spaces (unlabeled). The color pixel layer 23 is disposed on the glass substrate 21, and at least comprises first, second and third color resist units (unlabeled, such as resist units of the three primary colors of light: red, blue and green), and they are respectively disposed in the corresponding spaces of the black matrix layer.

As shown in FIG. 2, an inner surface of the color filter substrate 20 (a bottom surface of the color filter substrate 20 in the figure) of the liquid crystal panel 100 is provided with a transparent conductive layer 24, and the transparent conductive layer 24 covers the black matrix layer 22 and the color pixel layer 23. The thin-film transistors 11 of the array substrate 10 correspond with the black matrix layer 22 of the color filter substrate 20. An inner surface of the array substrate 10 (an upper surface of the array substrate in the figure) is further provided with a plurality of transparent conductive layers 12 of array substrate, and the transparent conductive layers 12 correspond with the color pixel layer 23 of the color filter substrate 20. By a plurality of spacers (not shown), a constant distance D is kept between the array substrate 10 and the color filter substrate 20 for filling with liquid crystal (not shown), and the transparent conductive layers 12 of the array substrate 10 are not electrically connected with the transparent conductive layer 24 of the color filter substrate 20.

Figure 3:
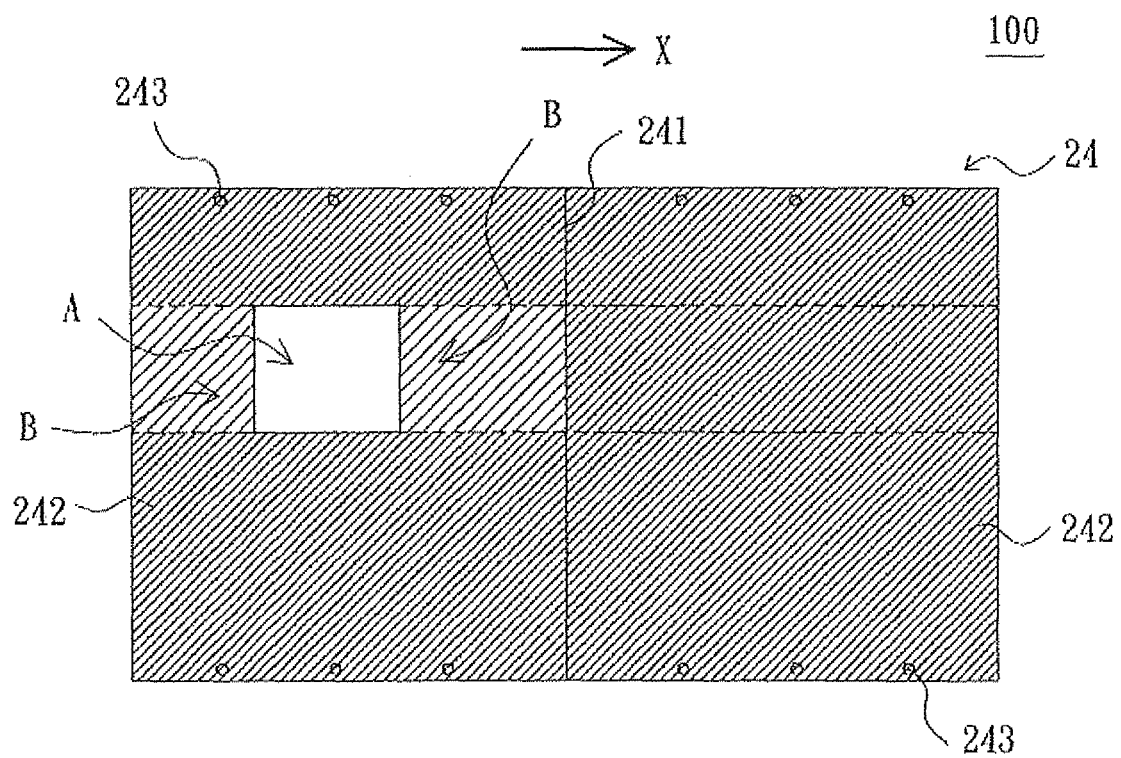
FIG. 3 is a structural schematic view of the liquid crystal panel according to the first preferred embodiment of the present invention.

Referring now to FIG. 3, a structural schematic view of the liquid crystal panel according to the first preferred embodiment of the present invention is illustrated in FIG. 3. The transparent conductive layer 24 is disposed on the inner surface of the color filter substrate 20 of the liquid crystal panel 100, and covers the black matrix layer 22 and the color pixel layer 23. The transparent conductive layer 24 comprises at least one separation line 241 which is perpendicular to a scan direction X of horizontal source signals. The separation line 241 divides the transparent conductive layer 24 into two transparent conductive layer sections 242, wherein each of the adjacent transparent conductive layer sections 242 is not connected with the others, Therefore, as shown in FIG. 3, when the brightness difference between an area A (for example a high brightness rectangle) and an area B (for example a dark area outside of the area A) is increased to a certain level, an electric potential of a common electrode (COM) of the color filter substrate 20 in the area B is coupled with a high electric potential of the area A through the transparent conductive layer 24, so that a horizontal crosstalk (H-crosstalk) phenomenon is generated. However, because the transparent conductive layer sections 242 are not connected with the others, the H-crosstalk phenomenon in the area B of the left transparent conductive layer section 242 does not influence the right transparent conductive layer section 242, so that in a manner, it can lower the H-crosstalk phenomenon of the liquid crystal panel 100.

The transparent conductive layer 24 according to the present invention is preferably been an ITO (indium tin oxide) layer, and the separation line 241 of the transparent conductive layer 24 can be achieved by laser method, but the present invention is not limited thereto.

Additionally, the separation lines 241 are preferably equidistantly spaced apart from each other, namely, the transparent conductive layer 24 is divided into the plurality of transparent conductive layer sections 242 with the same width. The separation line 241 is preferably disposed above the black matrix layer 22, so as to avoid influencing the color pixel layer 23. Besides, an upper and lower ends of each of the transparent conductive layer sections 242 are preferably provided with at least one conductive through hole 243 (VIA hole), so as to satisfy the requirement of each of the transparent conductive layer sections 242.

Figure 4:
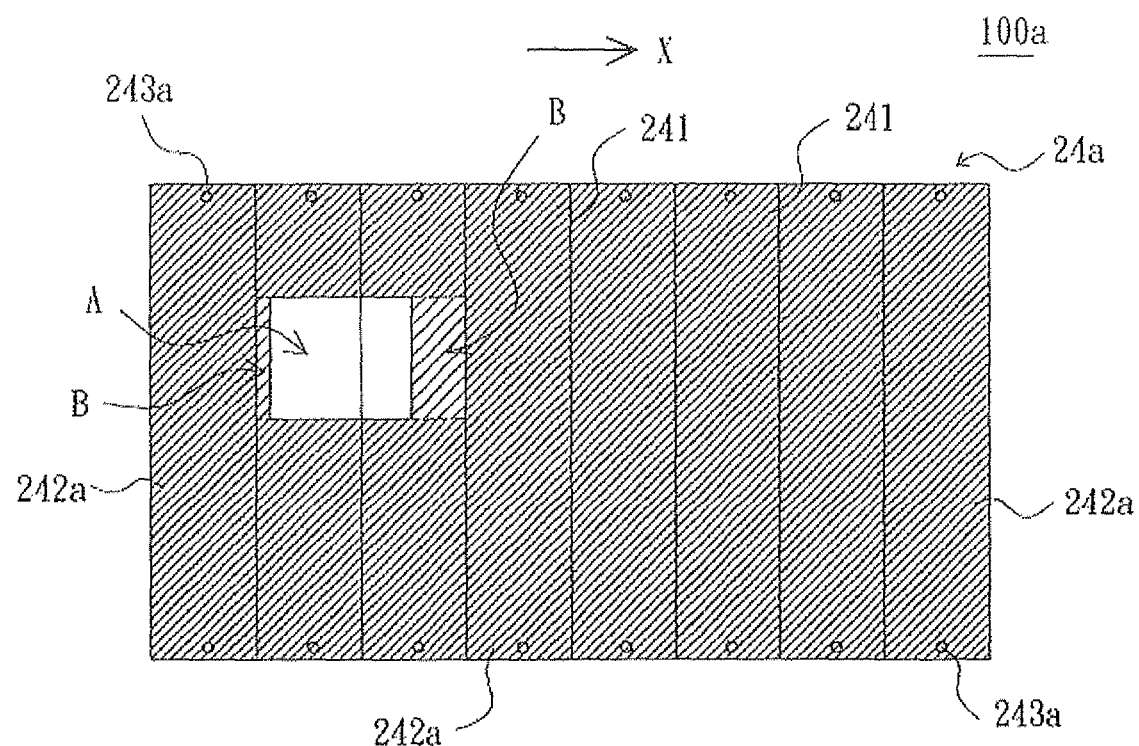
FIG. 4 is a structural schematic view of a liquid crystal panel according to a second preferred embodiment of the present invention.

Referring now to FIG. 4, a structural schematic view of a liquid crystal panel according to a second preferred embodiment of the present invention is illustrated in FIG. 4. The liquid crystal panel 100a of the second embodiment is similar to the liquid crystal panel 100 of the first embodiment, thus using similar terms and numerals to the foregoing embodiment, the difference of this embodiment being that: in this embodiment, the number of the separation line 241a is seven, so that the transparent conductive layer 24a is divided into eight transparent conductive layer sections 242a, wherein each of the adjacent transparent conductive layer sections 242a is not connected with the others. When the H-crosstalk phenomenon is generated, because the adjacent transparent conductive layer sections 242a are not connected with each others, the H-crosstalk phenomenon in the area B does not influence the adjacent horizontal area, so that the display quality of the liquid crystal panel 100a is increased.

Figure 5:
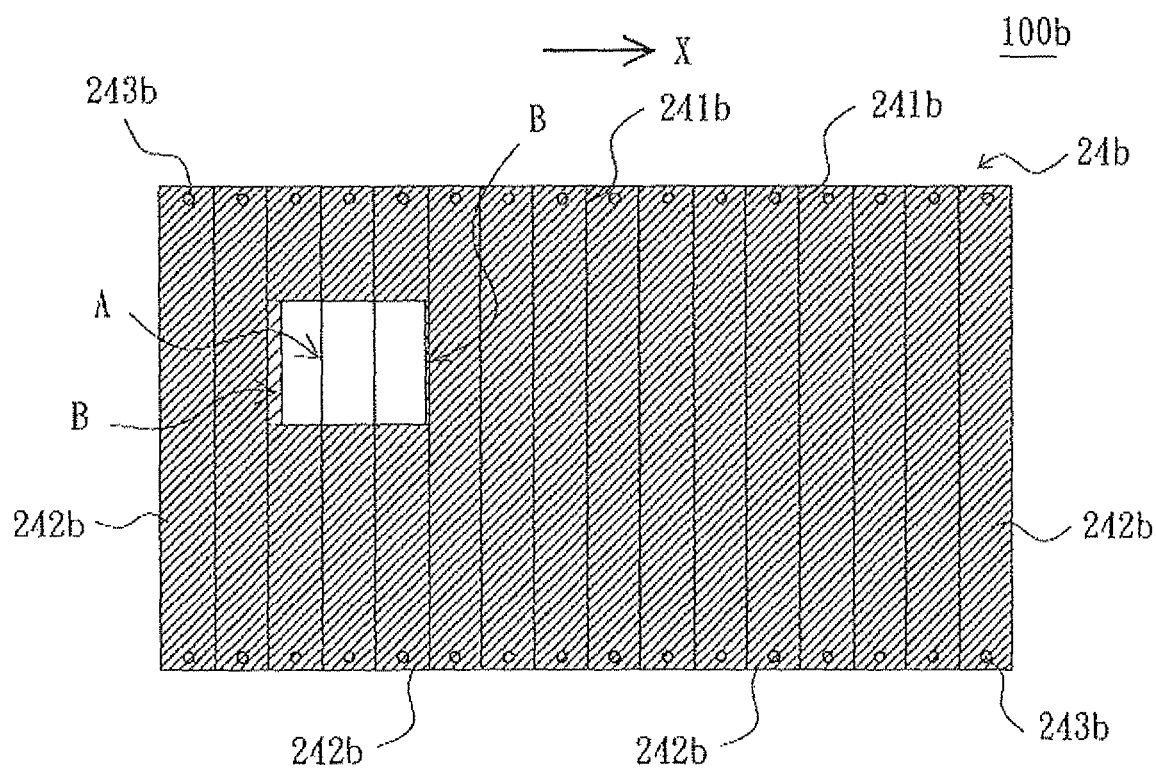
FIG. 5 is a structural schematic view of a liquid crystal panel according to a third preferred embodiment of the present invention.

Referring now to FIG. 5, a structural schematic view of a liquid crystal panel according to a third preferred embodiment of the present invention is illustrated in FIG. 5. The liquid crystal panel 100b of the third embodiment is similar to the liquid crystal panel 100 of the first embodiment, thus using similar terms and numerals to the foregoing embodiment, the difference of this embodiment being that: in this embodiment, the separation lines 241b divide the transparent conductive layer 24b into sixteen transparent conductive layer sections 242b, wherein each of the adjacent transparent conductive layer sections 242b is not connected with the others. When the H-crosstalk phenomenon of the liquid crystal panel 100b is generated, because the adjacent transparent conductive layer sections 242b are not connected with each others, the H-crosstalk phenomenon in the area B does not influence the adjacent horizontal area. Besides, the transparent conductive layer 24b is divided into more of the transparent conductive layer sections 242b, it can substantially lower the H-crosstalk phenomenon of the liquid crystal panel 100b, so that the display quality of the liquid crystal panel 100b is outstandingly increased.

In contrast to the traditional technical field of liquid crystal panels, a circuit design is generally adopted to decrease the influence of the H-crosstalk phenomenon. However, the H-crosstalk phenomenon is generated based on an interactive effect of circuit couple, so that it is not quite effective to improve the H-crosstalk phenomenon by the circuit design. In the present invention, the H-crosstalk phenomenon is lowered by changing the structure of a color filter substrate 20 of a liquid crystal panel 100. That is to say, by at least one separation line 241 being perpendicular to a scan direction X of horizontal source signals, the transparent conductive layer 24 of the color filter substrate 20 is divided into a plurality of transparent conductive layer sections 242, wherein each of the transparent conductive layer sections 242 is not connected with the others. When the H-crosstalk phenomenon is generated, the adjacent horizontal area is not influenced, so that it can lower the H-crosstalk phenomenon of the liquid crystal panel 100, so as to increase the display quality of the liquid crystal panel 100.

The present invention has been described with preferred embodiments thereof and it is understood that many changes and modifications to the described embodiments can be carried out without departing from the scope and the spirit of the invention that is intended to be limited only by the appended claims.

The invention claimed is:

1. A color filter substrate, comprising:
   a glass substrate;
   a black matrix layer disposed on the glass substrate to form a plurality of array-shaped spaces disposed on the glass substrate;
   a color pixel layer disposed on the glass substrate and including first, second and third color resist units respectively disposed in the corresponding spaces of the black matrix layer; and
   a transparent conductive layer covering the black matrix layer and the color pixel layer, wherein the transparent conductive layer has at least one separation line perpendicular to a scan direction X of horizontal source signals, and the separation line divides the transparent conductive layer into a plurality of transparent conductive layer sections, each of which is unconnected with the others, and two ends of each of the transparent conductive layer sections are provided with at least one conductive through hole, respectively.

2. The color filter substrate according to claim 1, wherein a plurality of the separation lines are equidistantly spaced apart from each other.

3. The color filter substrate according to claim 1, wherein the separation line is disposed above the black matrix layer.

4. A liquid crystal panel, comprising:
   an array substrate, a surface of which is provided with a plurality of array-arranged thin-film transistors; and
   a color filter substrate, including:
   a glass substrate;
   a black matrix layer disposed on the glass substrate to form a plurality of array-shaped spaces disposed on the glass substrate;
   a color pixel layer disposed on the glass substrate and including first, second and third color resist units respectively disposed in the corresponding spaces of the black matrix layer; and a transparent conductive layer covering the black matrix layer and the color pixel layer, wherein the transparent conductive layer has at least one separation line perpendicular to a scan direction X of horizontal source signals, and the separation line divides the transparent conductive layer into a plurality of transparent conductive layer sections, each of which is unconnected with the others, and two ends of each of the transparent conductive layer sections are provided with at least one conductive through hole, respectively:

wherein the thin-film transistors of the array substrate correspond with the black matrix layer of the color filter substrate, and a constant distance is kept between the array substrate and the color filter substrate for filling with liquid crystal.

5. The liquid crystal panel according to claim 4, wherein a plurality of the separation lines are equidistantly spaced apart from each other.

6. The liquid crystal panel according to claim 4, wherein the separation line is disposed above the black matrix layer.

7. The liquid crystal panel according to claim 4, wherein an inner surface of the array substrate is further provided with a plurality of transparent conductive layers of the array substrate, which correspond with the color pixel layer of the color filter substrate.

8. The liquid crystal panel according to claim 7, wherein the transparent conductive layers of the array substrate are electrically unconnected with the transparent conductive layer of the color filter substrate.

* * * * *